United States Patent
Chu et al.

(10) Patent No.: US 7,683,698 B2
(45) Date of Patent: Mar. 23, 2010

(54) APPARATUS AND METHOD FOR INCREASING CHARGE PUMP EFFICIENCY

(75) Inventors: Wen-Ting Chu, Kaohsiung (TW);
Yong-Shiuan Tsair, Tainan (TW);
Kuo-Wei Chu, Taipei (TW);
Cheng-Hsiung Kuo, Jhubei (TW);
Jih-Chen Wang, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 206 days.

(21) Appl. No.: 11/841,122

(22) Filed: Aug. 20, 2007

(65) Prior Publication Data

US 2009/0051413 A1    Feb. 26, 2009

(51) Int. Cl.
*G05F 1/10* (2006.01)
(52) U.S. Cl. ...................... 327/536; 327/535
(58) Field of Classification Search ......... 327/534–537; 363/59, 60
See application file for complete search history.

(56) References Cited

U.S. PATENT DOCUMENTS

| 5,432,469 | A | 7/1995 | Tedrow et al. |
| 5,818,289 | A | 10/1998 | Chevallier et al. |
| 5,982,223 | A * | 11/1999 | Park et al. .................... 327/536 |
| 6,078,212 | A | 6/2000 | Lakhani |
| 6,674,317 | B1 | 1/2004 | Chou |
| 6,812,773 | B1 | 11/2004 | Chou |
| 2007/0273431 | A1* | 11/2007 | Sakurai et al. .............. 327/537 |

* cited by examiner

*Primary Examiner*—Long Nguyen
(74) *Attorney, Agent, or Firm*—Haynes and Boone, LLP

(57) ABSTRACT

A charge pump circuit is provided which includes at least two charge pump stages connected in series with a front charge pump stage having a first transistor for receiving an input voltage and a last charge pump stage having a second transistor for providing an output voltage. The first transistor is configured to operate at a first threshold voltage and the second transistor is configured to operate at a second threshold voltage different than the first threshold voltage.

20 Claims, 5 Drawing Sheets

APPARATUS AND METHOD FOR INCREASING CHARGE PUMP EFFICIENCY

BACKGROUND

The present disclosure relates generally to integrated circuits and, more particularly, to a charge pump circuit with multiple stages operating at different threshold voltages.

The demand for evermore compact, portable, and low cost consumer electronic devices has driven electronics manufacturers to develop and manufacture integrated circuits (IC) that operate with low power supply voltages resulting in low power consumption. There may be components of the devices that require higher voltages than the low power supply voltage. For example, devices having nonvolatile memory components such as flash memory may require very high voltages to program and erase memory cells. Generally, charge pump circuits have been used to generate high voltages in circuits with only low power supply voltages available. However, as device features and geometries continue to shrink to sub-micron size, the power supply voltages are also reduced. This can adversely effect a charge pump efficiency of the charge pump circuit in generating the required high voltages.

Therefore, what is needed is a simple and cost-effective apparatus and method for increasing the charge pump efficiency in charge pump circuits.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
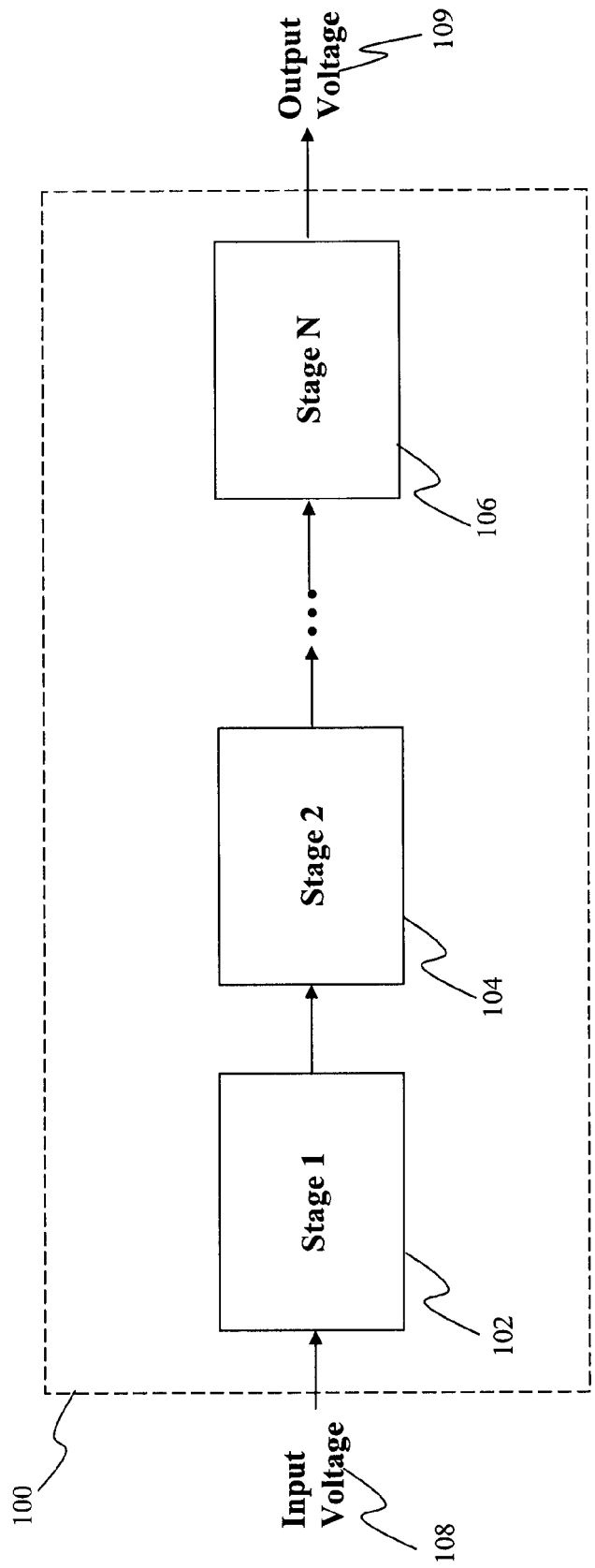
FIG. 1 is a block diagram of a charge pump circuit having N charge pump stages.

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In semiconductor devices, charge pump circuits have been used to generate high voltages in circuits with low power supply voltages available. Referring to FIG. 1, illustrated is a block diagram of a charge pump circuit 100 according to various aspects of the present disclosure. The charge pump circuit 100 may include a plurality of charge pump stages connected in series. In the disclosed embodiment, the number of charge pump stages is N including a front charge pump stage (Stage 1) 102, a second charge pump stage (Stage 2) 104, . . . , and a last charge pump stage (Stage N) 106. The charge pump circuit 100 may be configured to receive an input voltage 108 at the front charge pump stage (Stage 1) 102 and to provide an output voltage 109 at the last charge pump stage (Stage N) 106. The charge pump stages 102, 104, 106 may be configured to boost the voltage level of the input voltage 108 and provide for the required high voltage levels for the output voltage 109. It is understood that the number of charge pump stages may vary depending on the design requirements of a particular application.

Figure 2:
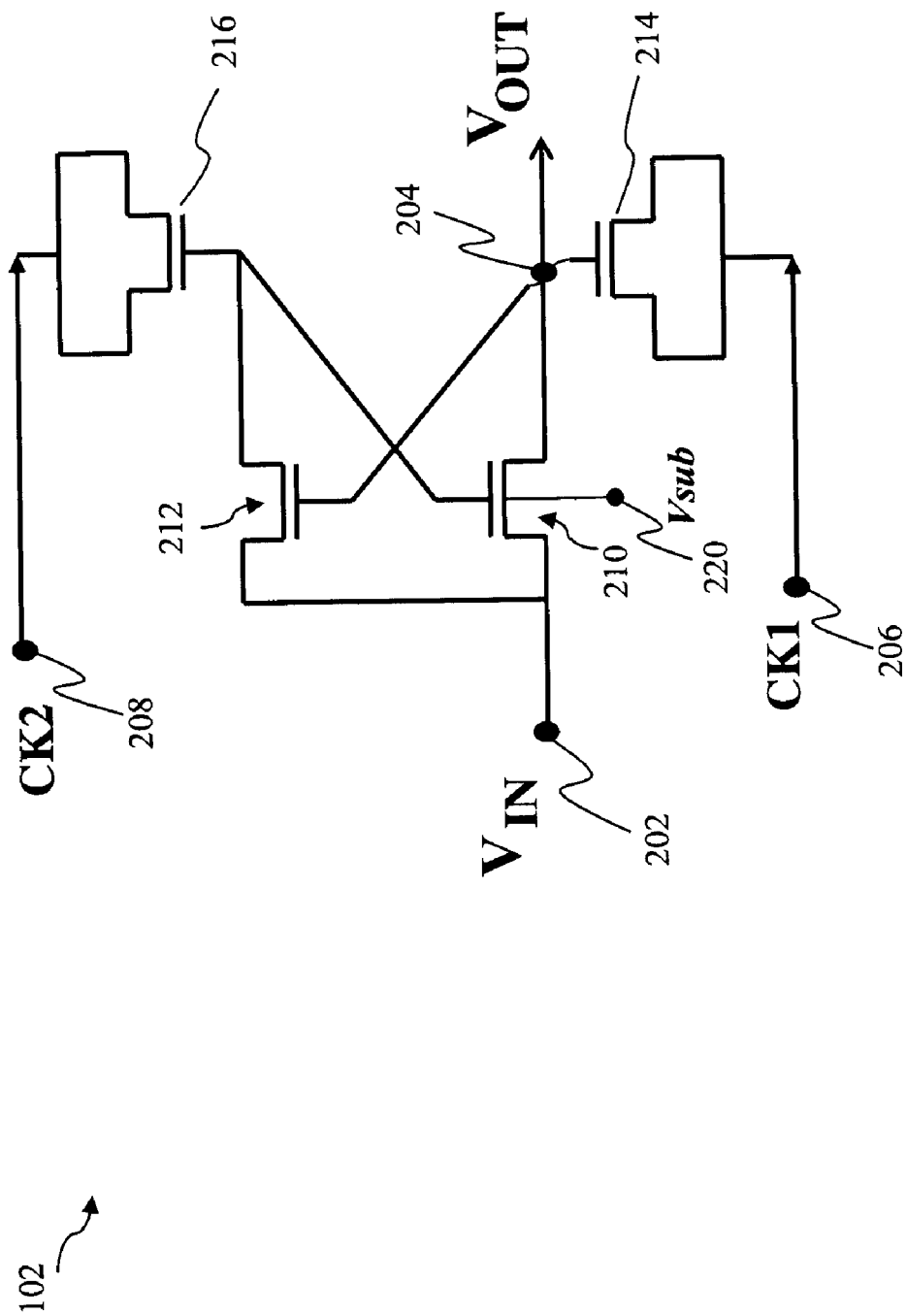
FIG. 2 is a schematic view of one of the N charge pump stages of the charge pump circuit of FIG. 1.

Referring to FIG. 2, illustrated is a schematic view of the front charge pump stage (Stage 1) 102 of the charge pump circuit 100 of FIG. 1. The front charge pump stage 102 may include an input node (Vin) 202, an output node (Vout) 204, a first clock node (CK1) 206, and a second clock node (CK2) 208. The front charge pump stage 102 may further include a first transistor 210, a second transistor 212, a first capacitor 214, and a second capacitor 216. The first transistor 210 and second transistor 212 may each include an N-channel MOSFETs (metal oxide semiconductor field-effect transistor). Alternatively, the transistors 210 and 212 may optionally include P-channel MOSFETs. Also, the transistors 210 and 212 may include other suitable types of transistors known in the art.

The first transistor 210 may include a source coupled to the input node 202, a drain coupled to the output node 204, and a gate coupled to one side of the second capacitor 216. The other side of the second capacitor 216 may be coupled to the second clock node 208. Also, the first transistor 210 may include a body or substrate 220 that may be back biased (Vsub) as will be discussed later. The second transistor 212 may include a source coupled the input node 202, a drain coupled to the one side of the second capacitor 216, and a gate coupled to one side of the first capacitor 214. The other side of the first capacitor 214 may be coupled to the first clock node 206.

Figure 3:
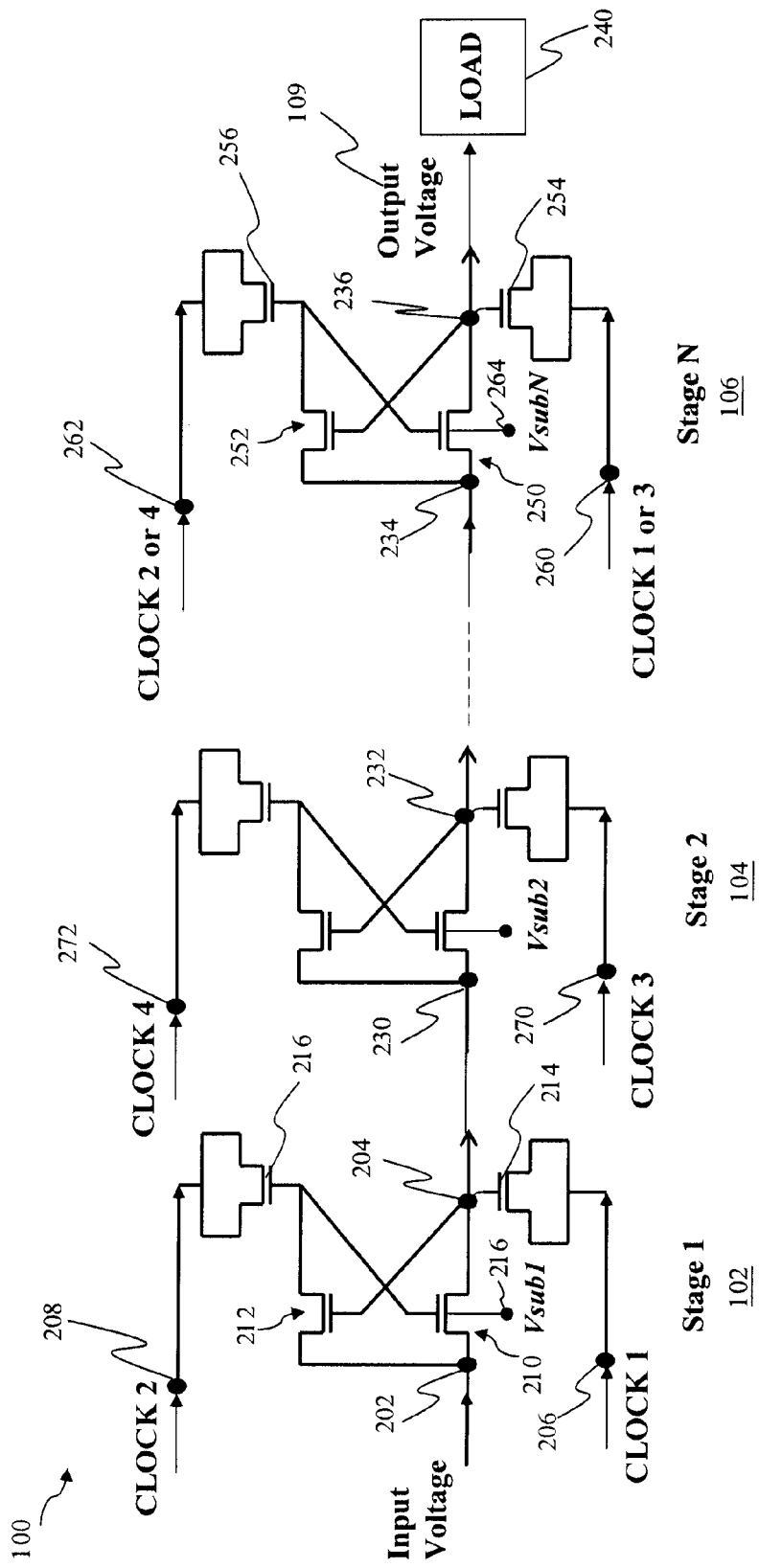
FIG. 3 is a schematic view of the charge pump circuit of FIG. 1.

Referring to FIG. 3, illustrated is schematic diagram of the charge pump circuit 100 of FIG. 1. As previously discussed, the charge pump circuit 100 may include N charge pump stages (Stage 1, Stage 2, . . . , Stage N) connected in series. The input voltage 108 may be provided to the input node 202 of the front charge pump stage (Stage 1) 102. The output node 204 of the front charge pump stage 102 may be coupled to an input node 230 of the second charge pump stage (Stage 2) 104. An output node 232 of the second charge pump stage 104 may be coupled to an input node of a not-illustrated third charge pump stage (Stage 3). These connections continue until an output node of a not-illustrated next-to-last charge pump stage (Stage N−1) may be coupled to an input node 234 of the last charge pump stage (Stage N) 106. The last charge pump stage 106 may include an output node 236 that is coupled to a load 240. The output node 236 provides the output voltage 109 for driving the load 240. It is understood that the configuration of the other charge pump stages 104 and 106 of the charge pump circuit 100 of FIG. 1 may be similar to the configuration of the front charge pump stage 102 except for the features disclosed below.

The last charge pump stage 106 may include a first clock node 260 and a second clock node 262. The last charge pump stage 106 may further include a first transistor 250, a second transistor 252, a first capacitor 254, and a second capacitor 256. The first transistor 250 and second transistor 252 may each include an N-channel MOSFET (metal oxide semiconductor field-effect transistor). Alternatively, the transistors 250 and 252 may optionally include P-channel MOSFETs. Also, the transistors 250 and 252 may include other suitable types of transistors known in the art.

The first transistor 250 may include a source coupled to the input node 234, a drain coupled to the output node 236, and a gate coupled to one side of the second capacitor 256. The other side of the second capacitor 256 may be coupled to the second clock node 262. Also, the first transistor 250 may include a body or substrate 264 that is back biased (Vsub) as will be discussed later. The second transistor 252 may include a source coupled the input node 234, a drain coupled to the one side of the second capacitor 256, and a gate coupled to one side of the first capacitor 254. The other side of the first capacitor 254 may be coupled to the first clock node 260.

In the disclosed embodiment, the first transistor 210 of the front charge pump stage 102 may be configured to operate at a first threshold voltage, and the first transistor 250 of the last charge pump stage 106 may be configured to operate at a second threshold voltage that is different than the first threshold voltage. The magnitude of the first threshold voltage may be greater than the magnitude of the second threshold voltage. The higher first threshold voltage of the first transistor 210 of the front charge pump stage 102 may be used to decrease a leakage current of the front charge pump stage. The lower second threshold voltage of the first transistor 250 of the last charge pump stage 106 may be used to increase a driving capacity of the last charge pump stage. Additionally, first transistors of the other charge pump stages (Stage 2 through Stage (N-1)) between the front charge pump stage (Stage 1) 102 and last charge pump stage (Stage N) 106 may be configured to operate at a threshold voltage ranging from about the first threshold voltage to about the second threshold voltage.

The first and second threshold voltages may be configured without an additional implantation process (e.g., additional photomask) when forming the source/drain regions of the different transistors. For example, the first transistor 210 of the front charge pump stage 102 may be configured with a first channel length associated with the higher first threshold voltage, and the first transistor 250 of the last charge pump stage 106 may be configured with a second channel length associated with the lower second threshold voltage. The first channel length may be greater than the second channel length and thus, the magnitude of the first threshold voltage may be greater than the magnitude of the second threshold voltage. The channel length of the transistor can be accurately controlled by controlling the feature size of the poly-silicon gate structure of the transistor. In the disclosed embodiment, the first channel length is about 1.5 μm and the second channel length is about 0.9 μm (both having a same channel width of about 10 μm). Accordingly, the first transistor 210 of the front charge pump stage 102 may have a channel width/length ratio of about 10/1.5, and the first transistor 250 of the last charge pump stage 106 may have a channel width/length ratio of about 10/0.9. It is understood that the channel length and width may vary depending on the particular application.

Additionally, it has been observed that by varying the back bias potential of the body of the transistor the threshold voltage of the transistor can be varied. As such, the first threshold voltage of the first transistor 210 of the front charge pump stage 102 may further be configured by back biasing the body 220 of the first transistor 210 to a first potential, and the second threshold voltage of the first transistor 250 of the last charge pump stage 106 may further be configured by back biasing the body 264 of the first transistor 250 to a second potential. The first and second potentials may be substantially the same. Alternatively, the first and second potentials may optionally be different.

In operation, the input voltage 108 may be supplied by a low power supply voltage having a magnitude of less than 2 volts. A first clock signal (CLOCK 1) may be provided to the first clock node 206 to control the charging of the first capacitor 214 of the front charge pump stage 102, and a second clock signal (CLOCK 2) may be provided to the second clock node 208 to control the charging of the second capacitor 216 of the front charge pump stage. In the disclosed embodiment, the charge pump circuit 100 may be configured as a four phase charge pump circuit. As such, a third clock signal (CLOCK 3) may be provided to a first clock node 270 of the second charge pump stage 104, and a fourth clock signal (CLOCK 4) may be provided to a second clock node 272 of the second charge pump stage 104. The clock signals for a four phase charge pump circuit are known in the art, and thus, not described in detail herein.

In the last charge pump stage 106, the first clock node 260 may be provided with CLOCK 1 or CLOCK 3, and the second clock node 262 may be provided with CLOCK 2 or CLOCK 4 depending on the total number of stages in the charge pump circuit 100. For example, if N (total number of stages) is an odd integer then CLOCK 1 may be provided to the first clock node 260 and CLOCK 2 may be provided to the second clock node 262. If N is an even integer then CLOCK 3 may be provided to the first clock node 260 and CLOCK 4 may be provided to the second clock node 262. The four clock signals for operating the charge pump circuit 100 as a four phase charge pump circuit are known in the art, and thus, are not described in detail herein. Alternatively, the charge pump circuit 100 may optionally be configured as a two phase charge pump circuit instead of a four phase charge pump circuit.

The operation of the charge pump circuit 100 can be understood by looking at the operation of the front charge pump stage 102. When CLOCK 1 goes high, the first capacitor 214 may be charged and causes a voltage level of the output node 204 to be pumped. This may cause the second transistor 212 to turn on and the input voltage 109 provided at the source is also provided to the drain of the second transistor 212. When CLOCK 1 goes low and CLOCK 2 goes high, the second capacitor 216 may be charged and causes the voltage level at the drain of the second transistor 212 to be pumped. This may cause the first transistor 210 to turn on and the input voltage 109 provided at the source is also provided to the drain of the first transistor 210 at the output node 204. When CLOCK 1 goes high, the first capacitor 214 may be charged and causes the voltage level at the output node 204 to be pumped and thus, the voltage level at the output node 204 is pumped above the voltage level of the input voltage 109.

This pumped voltage level at the output node 204 of the front charge pump stage 102 may then be provided to the input node 230 of the second charge pump stage 104 which operates in a similar manner except that the pumping of the second charge pump stage 104 is controlled by CLOCK 3 and CLOCK 4. In the last charge pump stage 106, the output voltage 109 provided at the output node 236 may be used to drive the load 240. For example, the load 240 may include control lines that program and reset memory cells in a flash memory circuit. It is understood that all the voltages described herein are referenced to a ground potential as is known in the art.

Figure 4:
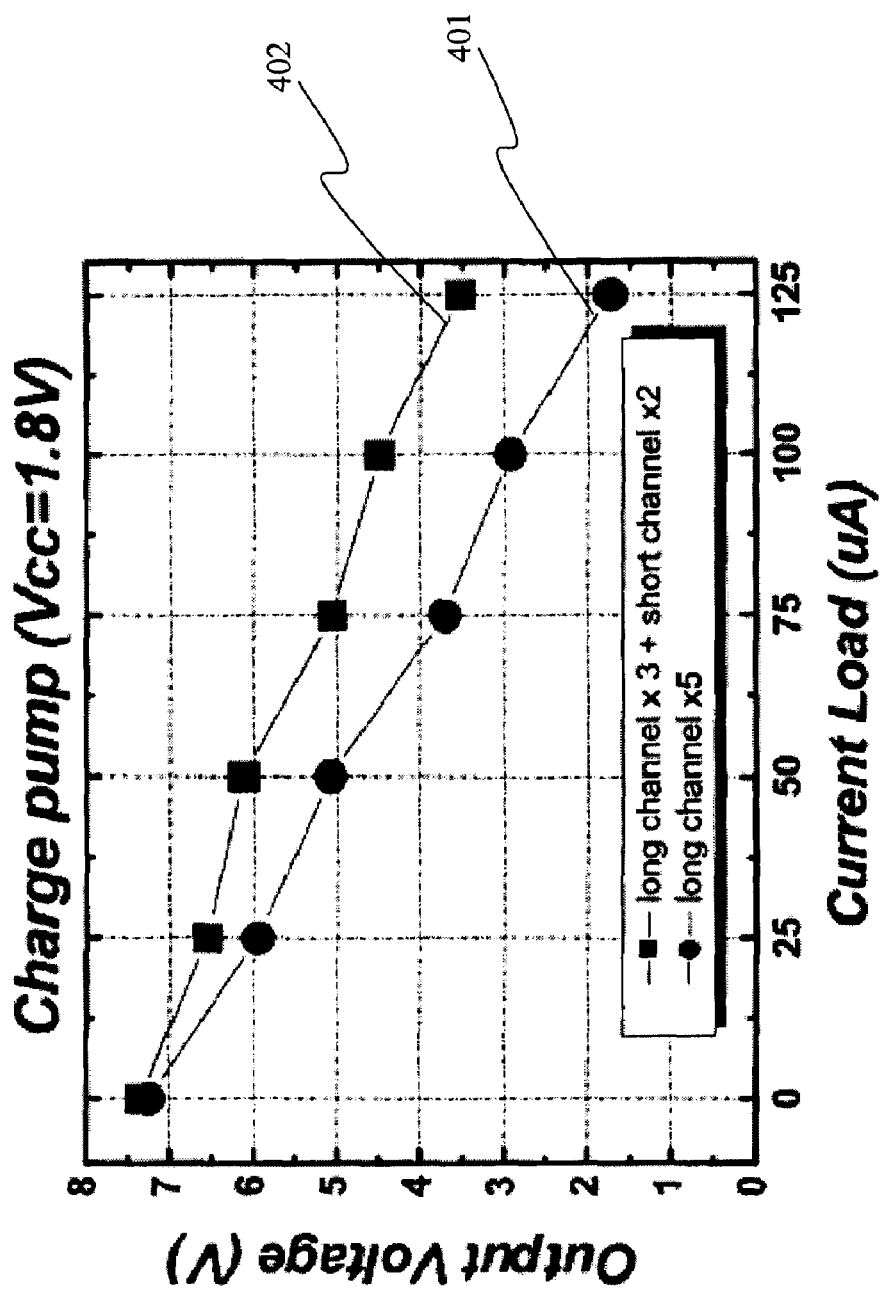
FIG. 4 is a graph that represents the relationship between an output voltage and current load of a conventional charge pump circuit as compared to the charge pump circuit of FIG. 1.

Referring to FIG. 4, illustrated is graph 400 showing two curves 401 and 402 that represent an output voltage (Volts) over a current load (μAmps) of two five stage charge pump circuits provided with an input voltage of 1.8 volts (e.g., Vcc). The two five stage chare pump circuits may be similar to the charge pump circuit 100 of FIG. 1 except for the features discussed below. The charge pump circuit associated with the first curve 401 is configured with five charge pump stages, each charge pump stage having a first transistor with the same channel length and operating at substantially the same threshold voltage. The charge pump circuit associated with the second curve 402 is configured with five charge pump stages, with the first three stages having a first transistor configured with a first channel length as was described in FIG. 3 and the last two stages having a first transistor configured with a second channel length as was described in FIG. 3. As such, the first transistors with the first channel length may operate at higher threshold voltage (magnitude) than the first transistors with the second channel length.

From the graph 400, the output voltage of the second curve 402 is at a higher level than the output voltage of the first curve 401 over the entire current load. Thus, the charge pump efficiency of the charge pump circuit associated with the second curve 402 is greater than the charge pump circuit associated with the first curve 401. Also, the difference in the voltage output between the two curves 401 and 402 increases as the current load increases. Therefore, the charge pump circuit associated with the second curve 402 has a greater driving capacity than the charge pump circuit associated with the first curve 401.

Figure 5:
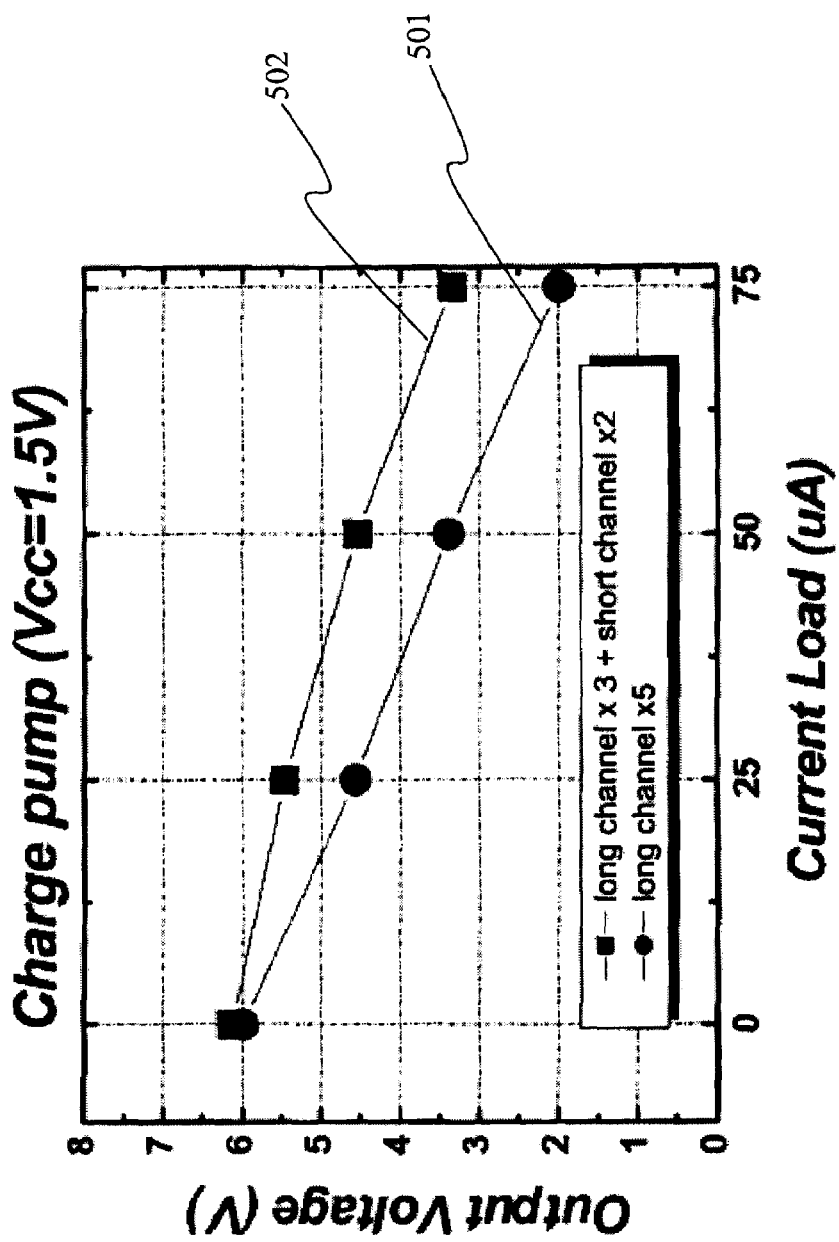
FIG. 5 is a graph that is similar to the graph of FIG. 4 except for a different input voltage.

Referring to FIG. 5, illustrated is graph 500 showing two curves 501 and 502 that represent an output voltage (Volts) over a current load (μAmps) of two five stage charge pump circuits provided with an input voltage of 1.5 volts (e.g., Vcc). The two five stage chare pump circuits may be similar to the charge pump circuit 100 of FIG. 1 except for the features discussed below. The charge pump circuit associated with the first curve 501 is configured with five charge pump stages, each charge pump stage having a first transistor with the same channel length and operating at substantially the same threshold voltage. The charge pump circuit associated with the second curve 502 is configured with five charge pump stages, with the first three stages having a first transistor configured with a first channel length as was described in FIG. 3 and the last two stages having a first transistor configured with a second channel length as was described in FIG. 3. As such, the first transistors with the first channel length may operate at higher threshold voltage (magnitude) than the first transistors with the second channel length.

From the graph 500, the output voltage of the second curve 502 is at a higher level than the output voltage of the first curve 501 over the entire current load. Thus, the charge pump efficiency of the charge pump circuit associated with the second curve 502 is greater than the charge pump circuit associated with the first curve 501. Also, the difference in the voltage output between the two curves 501 and 502 increases as the current load increases. Therefore, the charge pump circuit associated with the second curve 502 has a greater driving capacity than the charge pump circuit associated with the first curve 501.

Thus, provided is a charge pump circuit with at least two charge pump stages connected in series including a front charge pump stage having a first transistor configured to receive an input voltage and a last charge pump stage having a second transistor configured to provide an output voltage. The first transistor is configured to operate at a first threshold voltage and the second transistor is configured to operate at a second threshold voltage different than the first threshold voltage. In some embodiments, the magnitude of the first threshold voltage is greater than the magnitude of the second threshold voltage. In some other embodiments, the front charge pump stage further includes a capacitor for storing energy to be transferred to a next charge pump stage, and the last charge pump stage further includes a capacitor for storing energy to be transferred to a load.

In other embodiments, a channel length of the first transistor is greater than a channel length of the second transistor. In some embodiments, a channel width/length ratio of the first transistor is greater than a channel width/length ratio of the second transistor. In still other embodiments, the first and second transistors are back biased such that the magnitude of the difference between the first threshold voltage and the second threshold voltage is increased. In some other embodiments, the magnitude of the input voltage is less than 2 volts. In other embodiments, the first and second transistors are MOSFETs. In some other embodiments, the charge pump circuit is configured as a four phase charge pump circuit.

Also provided is a method for operating a charge pump circuit that includes at least two charge pump stages connected in series. The method includes the steps of: configuring a transistor of a front charge pump stage to operate at a first threshold voltage; configuring a transistor of a last charge pump stage to operate at a second threshold voltage; receiving an input voltage via the transistor of the front charge pump stage; and providing an output voltage via the transistor of the last charge pump stage. The magnitude of the first threshold voltage is greater than the magnitude of the second threshold voltage. In some embodiments, the step of the configuring the transistor of the front charge pump stage includes configuring the transistor with a first channel length, and the step of configuring the transistor of the last charge pump stage includes configuring the transistor with a second channel length. The first channel length is greater than the second channel length.

In other embodiments, the step of receiving the input voltage via the transistor of the front charge pump stage includes receiving the input voltage with a magnitude of less than 2 volts. In other embodiments, the method further includes the step of back biasing the transistor of the front charge pump stage and back biasing the transistor of the last charge pump stage. In still other embodiments, the steps of the configuring the transistor of the front charge pump stage and configuring the transistor of the last charge pump stage include configuring both transistors without an additional implantation process. In other embodiments, the step of configuring the transistors includes configuring the transistors to include MOSFETs.

Additionally, a semiconductor device is provided that includes a charge pump circuit having a plurality of charge pump stages connected in series, each charge pump stage includes a transistor and a capacitor, the transistor configured to transfer energy stored in the capacitor. The plurality of charge pump units includes a front charge pump unit and a last charge pump unit, the transistor of the front charge pump unit having a first threshold voltage and the transistor of the last charge pump unit having a second threshold voltage, the magnitude of the first threshold voltage being greater than the magnitude of the second threshold voltage. In some embodiments, the transistor of the front charge pump unit receives an input voltage that has a magnitude of less than 2 volts. In some other embodiments, the transistor of the last charge pump unit drives an output voltage that has a magnitude greater than 2 volts. In other embodiments, the transistor of the front charge pump unit includes a first back bias voltage, and the transistor of the last charge pump unit includes a second back bias voltage different than the first back bias voltage. In still other embodiments, the transistor of the front charge pump unit includes a first channel length, and the transistor of the last charge pump unit includes a second channel length less than the first channel length.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Several different advantages exist from these and other embodiments. In addition to providing an efficient and cost-effective apparatus and method for increasing charge pump efficiency, the apparatus and method disclosed herein can easily be integrated with current semiconductor processing equipment and techniques. In addition, the charge pump circuit disclosed herein addresses a leakage current concern at the front charge pump stage. Further, the apparatus and method disclosed herein increases a driving capacity of the charge pump circuit and thus, increases a fan-out count of the charge pump circuit.

What is claimed is:

1. A charge pump circuit comprising at least two charge pump stages connected in series that include:
    a front charge pump stage having a first transistor configured to receive an input voltage; and
    a last charge pump stage having a second transistor configured to provide an output voltage;
    wherein the first transistor is configured to operate at a first threshold voltage and the second transistor is configured to operate at a second threshold voltage different than the first threshold voltage.

2. The circuit of claim 1, wherein the magnitude of the first threshold voltage is greater than the magnitude of the second threshold voltage.

3. The circuit of claim 1, wherein the front charge pump stage further includes a capacitor for storing energy to be transferred to a next charge pump stage, and wherein the last charge pump stage further includes a capacitor for storing energy to be transferred to a load.

4. The circuit of claim 1, wherein a channel length of the first transistor is greater than a channel length of the second transistor.

5. The circuit of claim 4, wherein a channel width/length ratio of the first transistor is greater than a channel width/length ratio of the second transistor.

6. The circuit of claim 1, wherein the first and second transistors are back biased such that a magnitude of a difference between the first threshold voltage and the second threshold voltage is increased.

7. The circuit of claim 1, wherein the magnitude of the input voltage is less than 2 volts.

8. The circuit of claim 1, wherein the first and second transistors are MOSFETs.

9. The circuit of claim 1, wherein the charge pump circuit is configured as a four phase charge pump circuit.

10. A method for operating a charge pump circuit that includes at least two charge pump stages, the method comprising:
    configuring a transistor of a front charge pump stage to operate at a first threshold voltage;
    configuring a transistor of a last charge pump stage to operate at a second threshold voltage;
    receiving an input voltage via the transistor of the front charge pump stage; and
    providing an output voltage via the transistor of the last charge pump stage;
    wherein the magnitude of the first threshold voltage is greater than the magnitude of the second threshold voltage.

11. The method of claim 10, wherein the configuring the transistor of the front charge pump stage includes configuring the transistor with a first channel length, and configuring the transistor of the last charge pump stage includes configuring the transistor with a second channel length, wherein the first channel length is greater than the second channel length.

12. The method of claim 10, wherein the receiving the input voltage via the transistor of the front charge pump stage includes receiving the input voltage with a magnitude of less than 2 volts.

13. The method of claim 10, further comprising back biasing the transistor of the front charge pump stage and back biasing the transistor of the last charge pump stage.

14. The method of claim 10, wherein the configuring the transistor of the front charge pump stage and configuring the transistor of the last charge pump stage includes configuring both transistors without an additional implantation process.

15. The method of claim 10, wherein the configuring the transistors includes configuring the transistors to include MOSFETs.

16. A semiconductor device comprising a charge pump circuit that includes:
    a plurality of charge pump units connected in series, each charge pump unit having a transistor and a capacitor, the transistor configured to transfer energy stored in the capacitor;
    wherein the plurality of charge pump units includes a front charge pump unit and a last charge pump unit, the transistor of the front charge pump unit having a first threshold voltage and the transistor of the last charge pump unit having a second threshold voltage, the magnitude of the first threshold voltage being greater than the magnitude of the second threshold voltage.

17. The device of claim 16, wherein the transistor of the front charge pump unit receives an input voltage that has a magnitude of less than 2 volts.

18. The device of claim 17, wherein the transistor of the last charge pump unit drives an output voltage that has a magnitude greater than 2 volts.

19. The device of claim 16, wherein the transistor of the front charge pump unit includes a first back bias voltage, and the transistor of the last charge pump unit includes a second back bias voltage different than the first back bias voltage.

20. The device of claim 16, wherein the transistor of the front charge pump unit includes a first channel length, and the transistor of the last charge pump unit includes a second channel length less than the first channel length.

* * * * *